United States Patent
Radoiu et al.

(10) Patent No.: US 9,044,707 B2
(45) Date of Patent: Jun. 2, 2015

(54) MICROWAVE PLASMA ABATEMENT APPARATUS

(75) Inventors: Marilena Radoiu, Lyons (FR); James Robert Smith, Taunton (GB); Andrew James Seeley, Bristol (GB)

(73) Assignee: Edwards Limited, West Sussex (GB)

( * ) Notice: Subject to any disclaimer, the term of this patent is extended or adjusted under 35 U.S.C. 154(b) by 1691 days.

(21) Appl. No.: 12/085,205

(22) PCT Filed: Sep. 25, 2006

(86) PCT No.: PCT/GB2006/003551
§ 371 (c)(1),
(2), (4) Date: Oct. 26, 2009

(87) PCT Pub. No.: WO2007/060385
PCT Pub. Date: May 31, 2007

(65) Prior Publication Data
US 2010/0038230 A1    Feb. 18, 2010

(30) Foreign Application Priority Data
Nov. 24, 2005  (GB) .................................. 0523947.0

(51) Int. Cl.
B01D 53/32 (2006.01)
B01J 19/12 (2006.01)
B01D 53/00 (2006.01)

(52) U.S. Cl.
CPC ............... *B01D 53/32* (2013.01); *B01J 19/126* (2013.01); *B01D 53/007* (2013.01); *B01D 2259/806* (2013.01); *B01D 2259/818* (2013.01)

(58) Field of Classification Search
CPC .................. B01D 2259/806; B01D 2259/818; B01D 53/007; B01D 53/32; B01J 19/126
USPC ........ 204/157.3, 157.15, 153.7; 422/108, 186
See application file for complete search history.

(56) References Cited

U.S. PATENT DOCUMENTS

| | | | | |
|---|---|---|---|---|
| 3,227,971 A | * | 1/1966 | Stewart | 333/17.1 |
| 3,733,248 A | * | 5/1973 | Chu et al. | 376/143 |
| 4,883,570 A | * | 11/1989 | Efthimion et al. | 204/157.3 |
| 5,124,014 A | * | 6/1992 | Foo et al. | 204/192.32 |
| 5,137,701 A | * | 8/1992 | Mundt | 204/157.3 |

(Continued)

FOREIGN PATENT DOCUMENTS

| CN | 1168521 C | 9/2004 |
|---|---|---|
| CN | 101500370 A | 8/2009 |

(Continued)

OTHER PUBLICATIONS

United Kingdom Search Report of Application No. GB 0523947.0 dated Mar. 31, 2006; Claims searched: 1-19; Date of search: Mar. 28, 2006.

(Continued)

*Primary Examiner* — Colleen M Raphael
(74) *Attorney, Agent, or Firm* — Shumaker & Sieffert, P.A.

(57) ABSTRACT

In a method of operating a microwave plasma abatement apparatus comprising a microwave generator, and a gas chamber for receiving microwave energy from the microwave generator and within which a plasma is generated using the microwave energy, the amount of microwave energy that is not absorbed within the gas chamber is monitored, and the power of the microwave energy generated by the microwave generator is adjusted in dependence on the monitored microwave energy.

22 Claims, 2 Drawing Sheets

(56) References Cited

U.S. PATENT DOCUMENTS

| | | | |
|---|---|---|---|
| 5,310,426 A * | 5/1994 | Mori | 118/723 MW |
| 5,468,356 A * | 11/1995 | Uhm | 204/157.3 |
| 5,580,387 A * | 12/1996 | Chen | 333/242 |
| 5,587,205 A * | 12/1996 | Saito et al. | 118/723 MW |
| 5,830,328 A * | 11/1998 | Uhm | 204/157.3 |
| 5,893,643 A * | 4/1999 | Kumar et al. | 250/338.1 |
| 5,952,245 A * | 9/1999 | Torii et al. | 438/720 |
| 5,968,587 A * | 10/1999 | Frankel | 219/390 |
| 6,184,623 B1 * | 2/2001 | Sugai et al. | 315/111.21 |
| 6,290,918 B1 * | 9/2001 | Rostaing et al. | 422/186 |
| 6,517,913 B1 | 2/2003 | Cheung et al. | |
| 6,558,635 B2 * | 5/2003 | Minaee et al. | 422/186 |
| 6,689,252 B1 * | 2/2004 | Shamouilian et al. | 204/157.15 |
| 6,888,040 B1 | 5/2005 | Shufflebotham et al. | |
| 7,160,521 B2 * | 1/2007 | Porshnev et al. | 422/186.04 |
| 7,381,290 B2 * | 6/2008 | Hall et al. | 118/723 MW |
| 7,638,727 B2 * | 12/2009 | Kumar et al. | 118/723 MW |
| 2002/0066535 A1 | 6/2002 | Brown et al. | |
| 2004/0195088 A1 * | 10/2004 | Rostaing et al. | 422/186.04 |
| 2006/0163054 A1 * | 7/2006 | Spitzl et al. | 204/157.15 |
| 2006/0213759 A1 * | 9/2006 | Holzschuh et al. | 204/157.15 |

FOREIGN PATENT DOCUMENTS

| | | |
|---|---|---|
| EP | 1 377 138 A1 | 1/2004 |
| GB | 2 273 027 A | 6/1994 |
| GB | 2 319 941 A | 6/1998 |
| JP | 2005-058586 | 3/2005 |
| WO | WO 96/13621 | 5/1996 |

OTHER PUBLICATIONS

PCT Notification of Transmittal of the International Search Report and the Written Opinion of the International Searching Authority, or the Declaration of International Application No. PCT/GB2006/003551; Date of mailing: Dec. 20, 2006.

PCT International Search Report of International Application No. PCT/GB2006/003551; Date of mailing of the International Search Report: Dec. 20, 2006.

PCT Written Opinion of the International Searching Authority of International Application No. PCT/GB2006/003551; Date of mailing: Dec. 20, 2006.

Translation and original of First Office Action mailed Sep. 19, 2010 in corresponding CN Application No. 200680043944.0, 17 pgs.

Translation of Second Office Action mailed Jan. 13, 2012 in corresponding CN Application No. 200680043944.0, 6 pgs.

Translation of Decision on Rejection mailed Aug. 7, 2012 in corresponding Cn Application No. 200680043944.0, 14 pgs.

Translation of Notification of Reason(s) for Refusal mailed Jun. 4, 2012 in corresponding JP Application No. 2008-541803, 1 pg.

Translation of Notification of Reason(s) for Refusal mailed Sep. 6, 2013 in corresponding JP Application No. 2008-541803, 5 pg.

Translation of Notification of Reason(s) for Refusal mailed Feb. 24, 2011 in corresponding JP Application No. 2008-541803, 4 pg.

Translation and original Notice of Preliminary Rejection mailed Jan. 18, 2013 in corresponding KR Application No. 10-2008-7012384, 14 pg.

Translation of Notice of Preliminary Rejection mailed Nov. 20, 2012 in corresponding TW Application No. 095137031, 4 pg.

English Translation of the Notice of Final Rejection from counterpart Korean Patent Application No. 2008-7012384, dated Jun. 23 2014, 2 pp.

English Translation of Notice of Reexamination from counterpart Chinese Application No. 200680043944.0, dated Aug. 22, 2014, 10 pp.

* cited by examiner

MICROWAVE PLASMA ABATEMENT APPARATUS

FIELD OF THE INVENTION

The present invention relates to a microwave plasma abatement apparatus, and to a method of operating such an apparatus. The invention is particularly suitable to a microwave plasma abatement apparatus for treating gas streams exhausted from a plurality of process chambers.

BACKGROUND OF THE INVENTION

Various different gases may be supplied to a process chamber during the formation of a semiconductor or flat panel display device within the chamber. In a chemical vapour deposition process, gases are supplied to a process chamber housing the substrate and react to form a thin film over the surface of the substrate. For example, a LPCVD (low pressure chemical vapour deposition) nitride process uses DCS (dichlorosilane) and ammonia to form silicon nitride on thy surface of a wafer. In an etch process, gases such as boron trichloride and chlorine may be supplied to the chamber to remove unwanted aluminium, and in a polysilicon etch process, hydrogen bromide and chlorine are supplied to the chamber. Cleaning gases such as the perfluorinated compounds $CF_4$, $C_2F_6$, $NF_3$ and $SF_6$, and fluorine ($F_2$) may be periodically supplied to the chamber to clean unwanted deposits from the chamber.

A process tool typically has a plurality of process chambers, each of which may be at respective different stage in a deposition, etching or cleaning process, and so the gas being exhausted from the chambers at any given time may have various different pressures, compositions and/or mass flow rates. During these processes, there is typically a residual amount of the gas supplied to the process chamber contained in the gas exhausted from the process chamber. The perfluorinated compounds $CF_4$, $C_2F_6$, $NF_3$ and $SF_6$ are known to be greenhouse gases, and so it is desirable to remove these gases from the gas exhausted from the process chambers-prior to the venting of the gas into the atmosphere.

Perfluorinated compounds can be removed from a gas stream with high efficiency using a microwave plasma abatement device. An example of such a device is described in UK Patent no. GB 2,273,027. In that device, a waveguide conveys microwave radiation from a microwave generator into a gas chamber housing two electrodes in a closely opposed relationship. A gas to be treated flows into the gas chamber through a gas inlet, and passes between the electrodes. The electrodes serve to locally enhance the electric field of the microwave radiation passing through the chamber so that a microwave plasma can be initiated and sustained between the two electrodes from the gas flowing between the electrodes. One of the electrodes has an axial hole to provide a gas outlet from the gas chamber. Under the intensive conditions within the plasma, species within the gas stream are subjected to impact with energetic electrons causing dissociation into reactive species that can combine with oxygen or hydrogen added to the gas stream to produce relatively stable by-products.

The destruction and removal efficiency of a microwave plasma abatement device is dependent upon the amount of microwave power that is absorbed by the gas stream flowing through the gas chamber. For any given microwave power, the extent to which the microwave power is absorbed within the chamber is dependent upon a number of factors, including:
  chamber pressure;
  a the mass flow rate of the gas stream through the chamber;
  the composition of the gas stream;
  wear or damage to the electrodes or other components of the chamber; and
  any debris generated within the chamber from the erosion of the electrodes.

Therefore, when a single microwave plasma abatement device is arranged to receive the gas exhausted from a plurality of process chambers, it is usual practice to set the power of the microwave radiation at a fixed, relatively high level, for example 6 or 12 kW, in order to ensure that the efficiency of the device remains high at maximum values for the mass flow rate of, and the concentration of perfluorinated compounds within, the gas stream entering the device.

When the concentration of perfluorinated compounds in the gas stream is relatively low, and in particular when the mass flow rate of the gas stream is particularly low, for example when one or more of the process chambers is not being used, generation of the microwave radiation at a relatively high power can result in incomplete absorption of the power of the microwave radiation by the gas flowing within the gas chamber. In addition to the wastage of power, this can result in one or more of the following:
  overheating of the gas chamber;
  the reflection of microwave radiation back towards the microwave generator, which may result in damage to the microwave generator; and
  a change in the impedance of the gas chamber, which may reduce the destruction efficiency of the device.

It is therefore desirable to minimise the amount of microwave power that is not absorbed within the gas chamber without prejudice to the destruction and removal efficiency of the device.

SUMMARY OF THE INVENTION

Features described above in relation to the apparatus aspects of the invention are equally applicable to the method aspects, and vice versa.

BRIEF DESCRIPTION OF THE DRAWINGS

Preferred features of the present invention will now be described with reference to the accompanying drawings, in which.

DETAILED DESCRIPTION OF THE INVENTION

Figure 1:
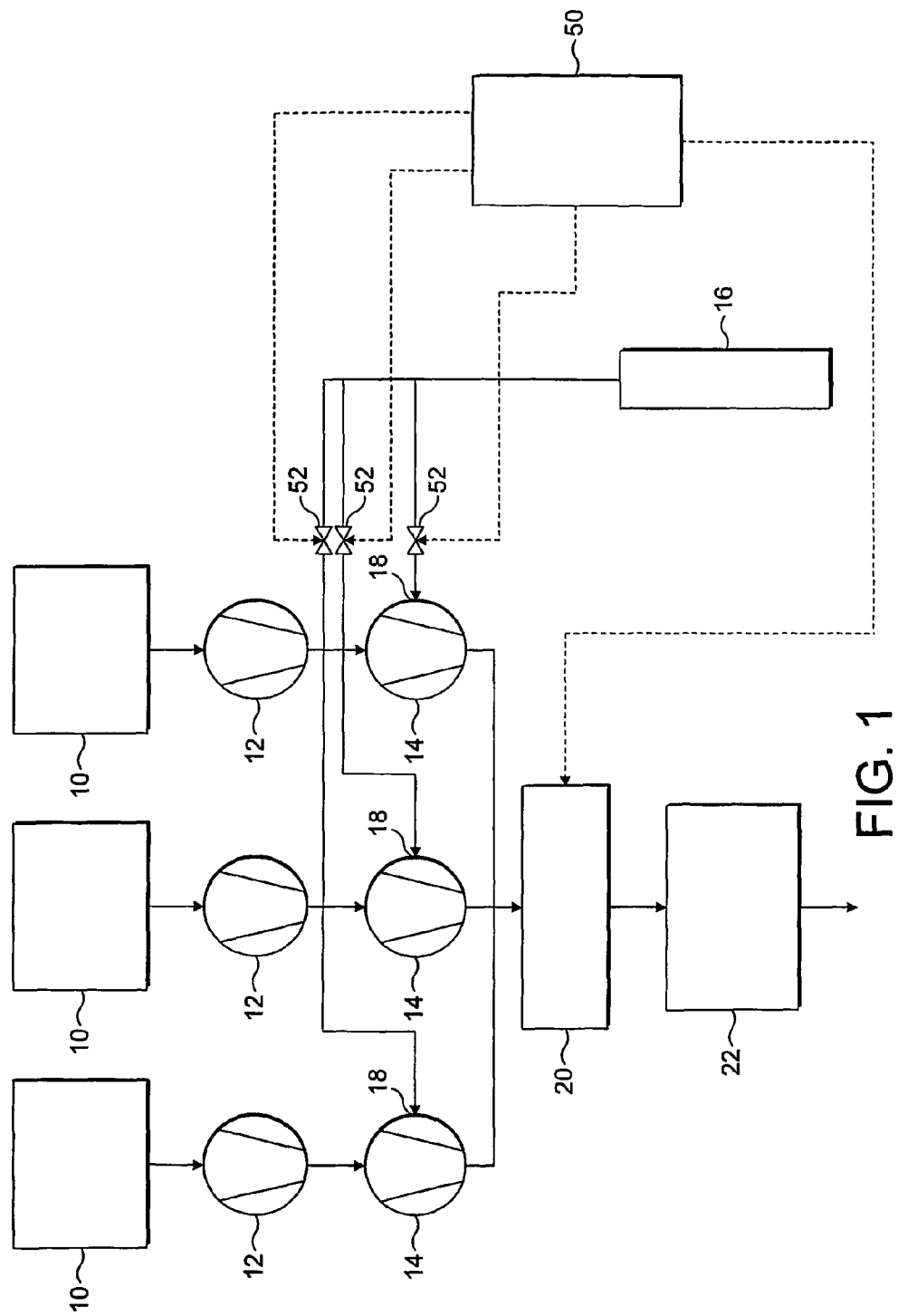
FIG. 1 illustrates schematically an apparatus for treating gas exhaust from a plurality of process chambers.

In a first aspect, the present invention provides microwave plasma abatement apparatus comprising a microwave generator, a gas chamber for receiving microwave energy from the microwave generator and within which a plasma is generated using the microwave energy, means for monitoring the amount of microwave energy that is not absorbed within the gas chamber, and means for adjusting the power of the microwave energy generated by the microwave generator in dependence on an output from the monitoring means.

The amount of microwave energy that is not absorbed within the gas chamber may be monitored, for example by monitoring the temperature of the gas chamber or, more preferably, by monitoring the power of microwave energy reflected from the gas chamber. When the amount of microwave energy that is not absorbed within the gas chamber is relatively high, the power of the microwave enemy generated by the microwave generator can be reduced to inhibit overheating of the chamber and to reduce operating costs. When the amount of microwave energy that is not absorbed within the gas chamber is relatively low, this may be indicative of an increased mass flow rate and/or an increase in the concentration of perfluorinated compounds within the gas stream, and so the power of the microwave energy generated by the microwave generator can be increased to maintain the destruction and removal efficiency of the apparatus at an acceptable value.

A detector for detecting the power of microwave radiation reflected from the gas chamber may be provided at any convenient location between the gas chamber and the microwave generator. In the preferred embodiment, the detector is located in a microwave waveguide isolator for preventing the reflected microwave radiation from travelling back to the microwave generator. Alternatively, the detector may be located in a circulator, a tuner or any other part of the waveguide. The gas chamber preferably comprises a microwave resonant cavity.

The amount of microwave energy that is not absorbed within the gas chamber may be continuously monitored, or alternatively it may be periodically monitored. The periodic monitoring may be performed at predetermined times, for example every few minutes, and/or the monitoring may be triggered by one or more events, such as a change in the gas stream entering the gas chamber. Data relating to a change in the mass flow rate of the gas stream may be received from a pump that receives a purge gas for pumping with the gas stream, a control system for controlling the amount of purge gas that is added to the gas stream, or from a flow meter for measuring the mass flow rate of the gas stream entering the gas chamber. Data relating to a change in the composition of the gas stream may be received from a controller of a process tool. Alternatively, the data may be supplied by a host computer that receives the data from the process tool, or from a gas sensor located upstream from the gas chamber. In the event that the gas stream is exhaust from a process chamber, the data may alternatively be indicative of the composition of the gas supplied to the process chamber, as from this data the composition of the exhaust gas may be predicted. For example, data indicative of the variation of the gas composition may be obtained by monitoring one or more variable flow control devices used to supply gas to the process chamber. The opening and closing of one or more valves for supplying gases to the process chamber may be detected, and/or the conductance of one or more mass flow controllers for controlling the rate at which gases are supplied to the process chamber, may be detected, for example by monitoring signals supplied to these devices.

In order to determine an optimal power for the generated microwaves, a control sequence may be performed in which the power of the generated microwaves is varied, for example by increasing and subsequently decreasing the power of the generated microwave energy. The output from the detector may be monitored as this power is varied, and the optimal power determined in dependence on the monitored output. For example, the optimal power may be determined as that above which the reflected power increases rapidly with increasing power of the generated microwave energy.

The apparatus is particularly suitable for use in treating gas streams exhausted from a plurality of process chambers, and so in a second aspect the present invention provides a microwave plasma abatement apparatus for treating gas exhausted from a plurality of process chambers, the apparatus comprising a microwave generator, a waveguide for conveying microwave energy from the microwave generator to a gas chamber for receiving said gas and within which a plasma is generated using the microwave energy, a detector for detecting the amount of microwave energy that is not absorbed within the gas chamber during treatment of said gas within the gas chamber, and a controller for adjusting the power of the microwave energy generated by the microwave generator in dependence on an output from the detector.

In a third aspect the present invention provides a method of operating a microwave plasma abatement apparatus comprising a microwave generator and a gas chamber for receiving microwave energy from the microwave generator and within which a plasma is generated using the microwave energy, the method comprising the steps of monitoring the amount of microwave energy that is not absorbed within the gas chamber, and adjusting the power of the microwave energy generated by the microwave generator in dependence on the amount of unabsorbed microwave enemy.

In a fourth aspect the present invention provides a method of treating a gas stream, comprising conveying the gas stream to a gas chamber, supplying microwave energy to the gas chamber to generate a plasma within the gas chamber, detecting the amount of microwave energy that is not absorbed within the gas chamber, and adjusting the power of the microwave energy supplied to the gas chamber in dependence on the amount of unabsorbed microwave energy.

With reference first to FIG. 1, a process tool comprises a plurality of process chambers 10 each for processing, for example, semiconductor devices, flat panel display devices or solar panel devices. Each process chamber 10 receives various process gases for use in performing the processing within the chamber 10. For example, boron trichloride and chlorine may be provided for performing a metal etch process, ammonia and dichlorosilane may be provided for performing an LPCVD process, and sources of hydrogen bromide and chlorine may be provided for etching polycrystalline silicon. The process tool controls the supply of the process gases to the chambers 10 by supplying control signals to valves and other flow control devices (not illustrated) for controlling the rate of supply of the process gases to the chambers.

With reference first to FIG. 1, a process tool comprises a plurality of process chambers 10 each for processing, for example, semiconductor devices, flat panel display devices or solar panel devices. Each process chamber 10 receives various process gases for use in performing the processing within the chamber 10. For example, boron trichloride and chlorine may be provided for performing a metal etch process, ammonia and dichlorosilane may be provided for performing an LPCVD process, and sources of hydrogen bromide and chlorine may be provided for etching polycrystalline silicon. The process tool controls the supply of the process gases to the chambers 10 by supplying control signals to valves and other flow control devices (not illustrated) for controlling the rate of supply of the process gases to the chambers.

An exhaust gas is drawn from the outlet of each of the chambers 10 by a respective pumping system. During the processing within the chamber 10, only a portion of the process gases will be consumed, and so the exhaust gas will contain a mixture of the process gases supplied to the chamber, and by-products from the processing within the chamber. Each pumping system may comprise a secondary pump 12, typically in the form of a turbomolecular pump or Roots booster pump, for drawing the exhaust gas from the chamber. A turbomolecular pump can generate a vacuum of at least $10^{-3}$ mbar in the chamber 10. Gas is typically exhausted from a turbomolecular pump at a pressure of around 1 mbar, and so the pumping systems also comprise a primary, or backing, pump 14 for receiving the gas exhaust from the turbomolecular pump 12 and raising the pressure of the gas to a pressure around atmospheric pressure.

LPCVD and metal etch processes can result in the production of condensable species as a by-product of the process, and HBr can corrode stainless steel in the presence of moisture. In order to inhibit condensation of these species within the backing pump 14, and to sweep the volume of the pump of any corrosive gases, a nitrogen or argon purge gas is supplied from a source 16 thereof to one or more purge ports 18 of each pump 14 for pumping with the gas exhausted from the chamber 10. The purge gas may alternatively, or additionally, be added to the exhaust gas at the exhaust of the pump 14, with the purge gas back streaming into the pump 14, and/or supplied to the seals of the pumps 14.

In addition to the process gases, cleaning gases are periodically supplied to the chambers 10 from a suitable source thereof. These cleaning gases are typically fluorine-containing gases, such as $F_2$, or a perfluorinated compound, such as $CF_4$, $NF_3$ or $SF_6$. Perfluorinated compounds may also be conveyed to the chambers 10 for other reasons, for example for the plasma etching of openings such as contacts, vias and trenches in materials formed on semiconductor substrates. The process tool controls the supply of the cleaning gas by issuing appropriate control signals to valves or other variable flow control devices.

Unconsumed perfluorinated cleaning gases are known to have relatively high greenhouse activity, and so before the gas streams exhausted from the pumps 14 are vented to the atmosphere, the gas streams are combined and conveyed to an abatement apparatus 20 to convert the greenhouse gases into species that can be readily removed from the gas, for example by a wet or dry scrubber 22, and/or can be safely exhausted to the atmosphere.

Figure 2:
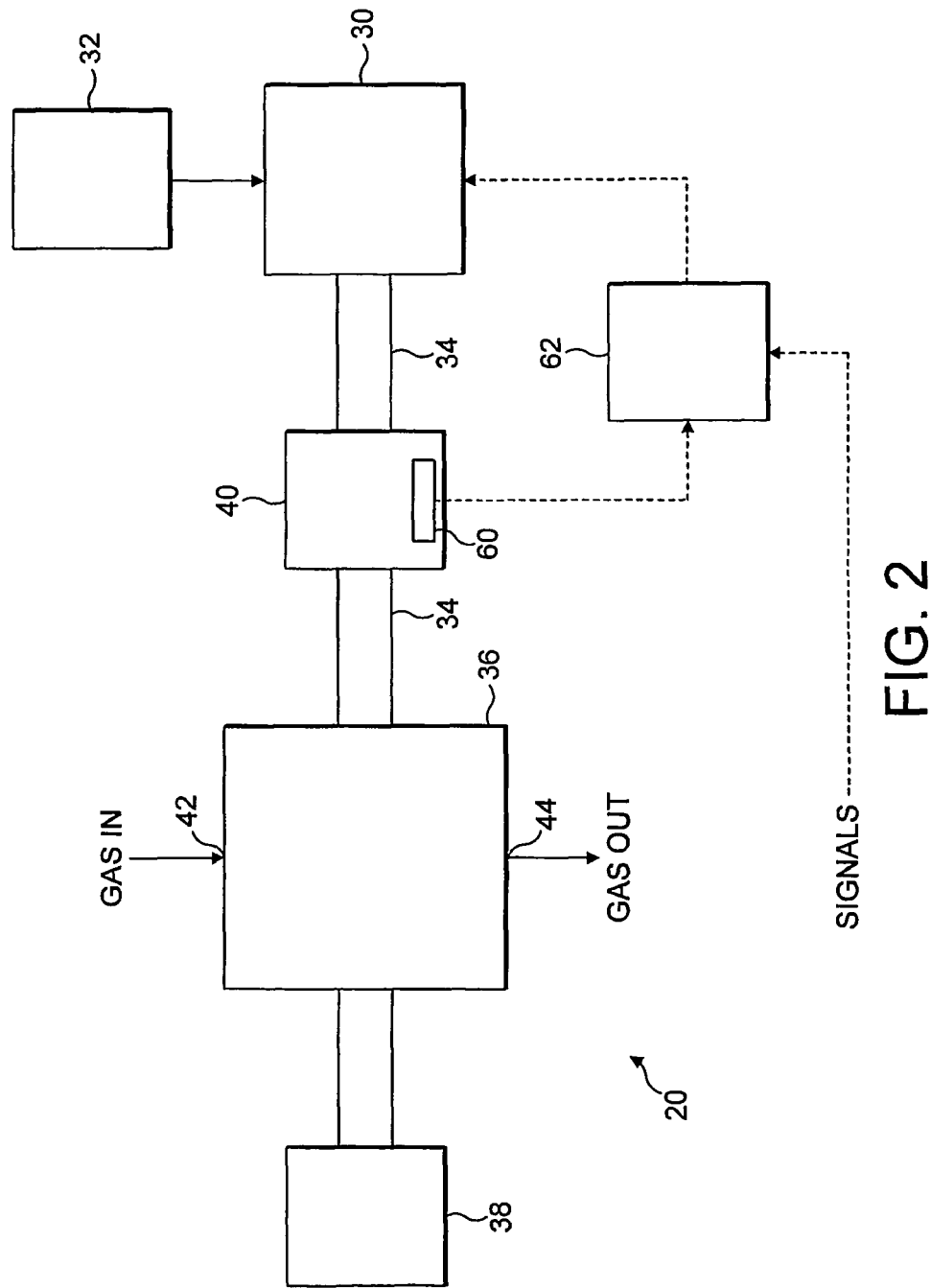
FIG. 2 illustrates schematically an embodiment of a microwave plasma abatement apparatus suitable for use in the apparatus of FIG. 1.

It is important that the abatement apparatus 20 is able to destroy greenhouse gases with high destruction rate efficiency, and so the abatement apparatus 20 is provided by a microwave plasma abatement apparatus. Such an apparatus is illustrated in more detail in FIG. 2. The apparatus comprises a microwave generator 30, a power supply 32, a waveguide 34, a gas chamber 36 and a short circuit 38. The microwave generator 30 is a magnetron capable of outputting from 125 to 6000 Watts at a frequency of approximately 2.45 GHz. The power supply 32 supplies power to the microwave generator 30 for the generation of microwave energy, which is supplied by microwave generator 30 to the waveguide 34. The waveguide 34 conveys the microwave energy to the gas chamber 36. Depending on space constraints, the waveguide 34 may include one or more curved sections (not shown). As illustrated in FIG. 2, the waveguide 34 includes a waveguide isolator 40 for removing microwaves that travel within waveguide 34 back towards the microwave generator 30. As is known, the isolator 40 uses magnetic fields to redirect these microwaves towards a dummy load that is configured to absorb the redirected microwaves.

The short circuit 38 provides an extension of the waveguide 34 on the opposite side of the gas chamber 36. The short circuit 38 comprises a chamber defined in part by an end plate that is located such that the incident microwave radiation is reflected by the end plate to form an electromagnetic standing wave within the gas chamber 36. The gas chamber 36 therefore provides a microwave resonant cavity. The short circuit 38 may also comprise a tuner for tuning the short circuit 38. This tuner may be provided by a stub screw threaded into the top surface of the short circuit 38 such that the body of the screw extends into the chamber of the short circuit substantially perpendicular to the direction of propagation of the microwave radiation through the chamber. By turning the head of the screw, the end of the screw can be raised or lowered within the chamber to tune the short circuit 38. One or more similar tuners may be also be provided within the waveguide 34, between the gas chamber 36 and the isolator 40.

The gas chamber 36 has a gas inlet port 42 for receiving the combined gas stream, and a gas outlet port 44 from which the treated gas stream is exhausted from the gas chamber towards the scrubber 22. The gas inlet port 42 may be arranged such that gas enters the gas chamber 36 substantially tangentially, so that the gas swirls inwardly within the gas chamber 36 towards the centre of the gas chamber 36. In this case, the gas outlet port 44 is formed in the base of the gas chamber, preferably co-axial with the gas chamber 36. In the event that the gas streams exhausted from two or more of the process chambers 10 are chemically incompatible, the gas chamber 36 may be provided with one or more additional inlet ports each for receiving a gas stream directly from the pumping system of a respective process chamber 10, so that incompatible gases may be conveyed separately to the gas chamber 36.

The gas chamber 36 may include one or more electrodes for intensifying the electric field created in the gas chamber 36 by the microwave radiation. Depending on the power of the microwave energy conveyed to the gas chamber 36, the intensity of electric field created within the gas chamber 36 may be insufficient to ignite a plasma within the gas chamber 36 from the gas passing through the gas chamber 36. Therefore, the gas chamber 36 may include an ignition device that is used to strike the plasma during initiation. Under the intensive conditions within the plasma, species within the gas flowing through the gas chamber 36 are subjected to impact with energetic electrons causing dissociation into reactive species. These reactive species can combine with $H_2$ or $H_2O$ added to the gas stream either upstream from or within the gas chamber 36 to produce relatively stable by-products When a process chamber 10 is not in use, it is a common practice to reduce the speed of the pumps 12, 14 used to evacuate that process chamber, and to reduce the amount of purge gas supplied to the backing pump 14, to save costs. As illustrated in FIG. 1, a control system is provided for adjusting the amount of purge gas supplied to the backing pumps 14. In the illustrated embodiment, the control system is provided by a purge gas controller 50 that may receive data from the process tool or a host computer indicating which pumps 12, 14 are to be, or have been, slowed down. In response to this data, the purge gas controller 50 outputs appropriate control signals to valves 52 or other variable flow control devices to adjust the amount of purge gas supplied to one or more of the backing pumps 14, in this example by varying the flow rate of the purge gas, depending on the received data.

When the supply of purge gas to one or more of the pumps 12, 14 is reduced, the total mass flow rate of gas through the gas chamber 36 also reduces. The amount of microwave power that is absorbed within the gas chamber 36 is dependent upon, inter alia, the mass flow rate of gas through the gas chamber 36, and so when the mass flow rate decreases, the amount of microwave power that is absorbed within the gas chamber 36 also decreases. Any microwave power that is not absorbed within the gas chamber 36 is not only wasteful, but can lead to overheating of the gas chamber 36 and the reflection of microwave radiation back towards the microwave generator 30, which, in the absence of an isolator, can damage the abatement apparatus 20.

In view of this, the abatement apparatus includes a means for monitoring the amount of microwave energy that is not absorbed within the gas chamber 36. In this embodiment, the apparatus includes a detector 60 for detecting the power of microwave energy reflected from the gas chamber 36 back towards the microwave generator 30. As illustrated in FIG. 2, the detector 60 may be located in the waveguide isolator 40. The detector 60 outputs a signal indicative of the detected power to a controller 62. This signal may be output continuously, periodically, or in response to a command issued by the controller 62. In dependence on the received signal, the controller 62 outputs a control signal to the microwave generator 30 to adjust the power of the generated microwave energy. For example, in the event that there has been an increase in the reflected power, the controller 62 preferably issues an appropriate control signal to the microwave generator 30 to decrease the power of the generated microwaves until the signal received from the detector 60 indicates that the reflected power is at or below a predetermined value. In this manner, the destruction and removal efficiency of the abatement apparatus 20 can be maintained at or above a predetermined level whilst the power of the generated microwaves is minimised.

It is clearly desirable that the destruction and removal efficiency of the abatement apparatus 20 remains at or above the predetermined level substantially at all times. Therefore, when the mass flow rate of the gas flowing through the gas chamber 36 subsequently increases again when one or more of the process chambers 10 are returned to use, it is important that the power of the generated microwaves is sufficient to maintain the required destruction and removal efficiency. In view of this, the controller 62 may be configured to periodically determine an optimal power for the microwaves generated by the microwave generator 30. This may be achieved using a relatively simple control procedure, in which the controller 62 controls the microwave generator 30 to first increase the power of the microwave energy, and then to decrease the power back towards the current level. The controller 62 monitors the output from the detector 60 as the microwave power is varied. From this output, the controller 62 can determine a value for the microwave power at which the reflected power from the gas chamber 36 starts to increase rapidly, indicating that above this value there is a marked increase in the amount of microwave energy that is not absorbed within the gas chamber 36. The controller 62 may then instruct the microwave generator 30 to generate microwaves of this power.

This control procedure may be initiated periodically, and/or in response to signals received by the controller 62 from the purge gas controller 50 indicating that there has been a change in the amount of purge gas added to the gases exhaust from the process chambers 10. Alternatively, or additionally, this control procedure may be initiated in response to a signal received from a pressure sensor for monitoring the pressure within the gas chamber 36, and/or in response to signals received from a controller of the process tool indicative of a change in the composition of the gases being supplied to the process chambers 10. Alternatively, the controller 62 may be isolated from the controller of the process tool, in which case data indicative of a variation of the composition of the gases supplied to the process chambers may be obtained by monitoring the state of the valves and other flow control devices used to control the supply of the gases to the process chambers.

While the foregoing description and drawings represent the preferred embodiments of the present invention, it will be apparent to those skilled in the art that various changes and modifications may be made therein without departing from the true spirit and scope of the present invention.

We claim:

1. A microwave plasma abatement apparatus comprising:
a microwave generator;
a gas chamber for receiving microwave energy from the microwave generator and within which a plasma is generated using the microwave energy, wherein the gas chamber comprises a gas inlet for receiving a gas stream and a gas outlet;
a waveguide connected between the microwave generator and the gas chamber, wherein the waveguide includes a waveguide isolator, and wherein the waveguide isolator generates at least one magnetic field to prevent reflected microwave radiation from travelling back to the microwave generator from the gas chamber;
a detector located in the waveguide isolator, wherein the detector is configured to monitor an amount of the microwave energy that is not absorbed within the gas chamber; and
a controller configured to adjust the power of the microwave energy generated by the microwave generator in dependence on an output from the detector and a change in the gas stream to reduce the amount of microwave energy that is not absorbed within the gas chamber while maintaining a gas destruction efficiency of the microwave plasma abatement apparatus at or above a predetermined level.

2. The apparatus of claim 1, wherein the detector is configured to detect the power of microwave energy reflected from the gas chamber.

3. The apparatus of claim 2, wherein the waveguide is configured to convey microwave radiation from the microwave generator to the gas chamber.

4. The apparatus according to claim 1, wherein the controller is configured to periodically adjust the power of the microwave energy generated by the microwave generator in dependence on the output from the detector and the change in the gas stream.

5. The apparatus of claim 1, wherein the controller is configured to adjust the power of the microwave energy generated by the microwave generator in dependence on the output from the detector and a change in the mass flow rate of the gas stream entering the gas chamber.

6. The apparatus of claim 1, wherein the controller is configured to adjust the power of the microwave energy generated by the microwave generator in dependence on the output from the detector and a change in the composition of the gas stream entering the gas chamber.

7. The apparatus of claim 1, wherein the controller is configured to vary the power of the microwave energy generated by the microwave generator, monitor the output from the detector as the power is varied, and determine an optimal power for the microwaves generated by the microwave generator in dependence on the output.

8. A microwave plasma abatement apparatus for treating gas exhausted from a plurality of process chambers, the apparatus comprising:
a microwave generator;
a waveguide for conveying microwave energy from the microwave generator to a gas chamber for receiving the gas and within which a plasma is generated using the microwave energy, wherein the waveguide comprises a waveguide isolator;
a detector located in the waveguide isolator, wherein the detector is configured to detect the amount of the microwave energy that is not absorbed within the gas chamber during treatment of the gas within the gas chamber, and wherein the waveguide isolator generates at least one magnetic field to prevent reflected microwave radiation from travelling back to the microwave generator from the gas chamber; and a controller configured to adjust the power of the microwave energy generated by the microwave generator in dependence on an output from the detector to reduce the amount of microwave energy that is not absorbed within the gas chamber while maintaining a gas destruction efficiency of the microwave plasma abatement apparatus at or above a predetermined level.

9. The apparatus of claim 8, wherein the gas chamber comprises a microwave resonant cavity.

10. A method of operating a microwave plasma abatement apparatus comprising a microwave generator, a gas chamber for receiving microwave energy from the microwave generator and within which a plasma is generated using the microwave energy, and a waveguide connected between the microwave generator and the gas chamber, wherein the waveguide includes a waveguide isolator, and wherein the gas chamber comprises a gas inlet for receiving a gas stream and a gas outlet, the method comprising:

monitoring the amount of the microwave energy that is not absorbed within the gas chamber via a detector disposed within the waveguide isolator, wherein the waveguide isolator generates at least one magnetic field to prevent reflected microwave radiation from travelling back to the microwave generator from the gas chamber;

monitoring a change in the gas stream entering the gas chamber;

adjusting the power of the microwave energy generated by the microwave generator in dependence on the amount of unabsorbed microwave energy and the change in the gas stream to reduce the amount of microwave energy that is not absorbed within the gas chamber while maintaining a gas destruction efficiency of the microwave plasma abatement apparatus at or above a predetermined level.

11. The method of claim 10, wherein:

monitoring the amount of microwave energy that is not absorbed within the gas chamber comprises monitoring the power of microwave energy reflected from the gas chamber, and adjusting the power of the microwave energy generated by the microwave generator comprises adjusting the power of the microwave energy generated by the microwave generator in dependence on the reflected power and the change in the gas stream.

12. The method of claim 10, wherein adjusting the power of the microwave energy generated by the microwave generator comprises periodically adjusting the power of the microwave energy generated by the microwave generator in dependence on the amount of unabsorbed microwave energy and the change in the gas stream.

13. The method of claim 10, wherein adjusting the power of the microwave energy generated by the microwave generator comprises adjusting the power of the microwave energy generated by the microwave generator in dependence on a change in the mass flow rate of the gas stream entering the gas chamber and the amount of unabsorbed microwave energy.

14. The method of claim 10, wherein adjusting the power of the microwave energy generated by the microwave generator comprises adjusting the power of the microwave energy generated by the microwave generator in dependence on a change in the composition of the gas stream entering the gas chamber and the amount of unabsorbed microwave energy.

15. The method of claim 10, further comprising varying the power of the microwave energy generated by the microwave generator, monitoring the amount of microwave energy that is not absorbed within the gas chamber as the power is varied, and determining an optimal power for the microwaves generated by the microwave generator in dependence on the unabsorbed amount of microwave energy.

16. A method of treating a gas stream, comprising:

conveying the gas stream to a gas chamber;

supplying microwave energy via a waveguide to the gas chamber to generate a plasma within the gas chamber, wherein the waveguide comprises a waveguide isolator;

detecting the amount of the microwave energy that is not absorbed within the gas chamber via a detector disposed within the waveguide isolator, wherein the waveguide isolator generates at least one magnetic field to prevent reflected microwave radiation from travelling back to the microwave generator from the gas chamber; and adjusting the power of the microwave energy supplied to the gas chamber in dependence on the amount of unabsorbed microwave energy to reduce the amount of microwave energy that is not absorbed within the gas chamber while maintaining a gas destruction efficiency at or above a predetermined level.

17. The method of claim 16, wherein:

detecting the amount of microwave energy that is not absorbed within the gas chamber comprises monitoring the power of microwave energy reflected from the gas chamber, and wherein adjusting the power of the microwave energy supplied to the gas chamber comprises adjusting the power of the microwave energy supplied to the chamber in dependence on the reflected power.

18. The method of claim 16, wherein adjusting the power of the microwave energy supplied to the gas chamber comprises periodically adjusting the power of the microwave energy supplied to the chamber in dependence on the amount of unabsorbed microwave energy.

19. The method of claim 16, wherein:

the gas chamber comprise a gas inlet for receiving the gas stream and a gas outlet, and wherein adjusting the power of the microwave energy supplied to the gas chamber comprises adjusting the power of the microwave energy supplied to the chamber in dependence on a change in the gas stream entering the gas chamber and the amount of unabsorbed microwave energy.

20. The method of claim 19, wherein adjusting the power of the microwave energy supplied to the chamber in dependence on a change in the gas stream entering the gas chamber and the amount of unabsorbed microwave energy comprises adjusting the power of the microwave energy supplied to the gas chamber in response to a change in the mass flow rate of the gas stream entering the gas chamber and the amount of unabsorbed microwave energy.

21. The method according to claim 19, wherein adjusting the power of the microwave energy supplied to the chamber in dependence on a change in the gas stream entering the gas chamber and the amount of unabsorbed microwave energy comprises comprising adjusting the power of the microwave energy supplied to the gas chamber in response to a change in the composition of the gas stream entering the gas chamber and the amount of unabsorbed microwave energy.

22. The method of claim 16, further comprising varying the power of the microwave energy supplied to the gas chamber, monitoring the amount of microwave energy that is not absorbed within the gas chamber as the power is varied, and determining an optimal power for the microwaves supplied to the chamber in dependence on the unabsorbed amount of microwave energy.

* * * * *